Feb. 7, 1950
J. G. HERBERS
CLUTCH AND BRAKE MECHANISM
FOR ORNAMENTING MACHINES
2,496,793
Filed Oct. 23, 1946
3 Sheets-Sheet 1
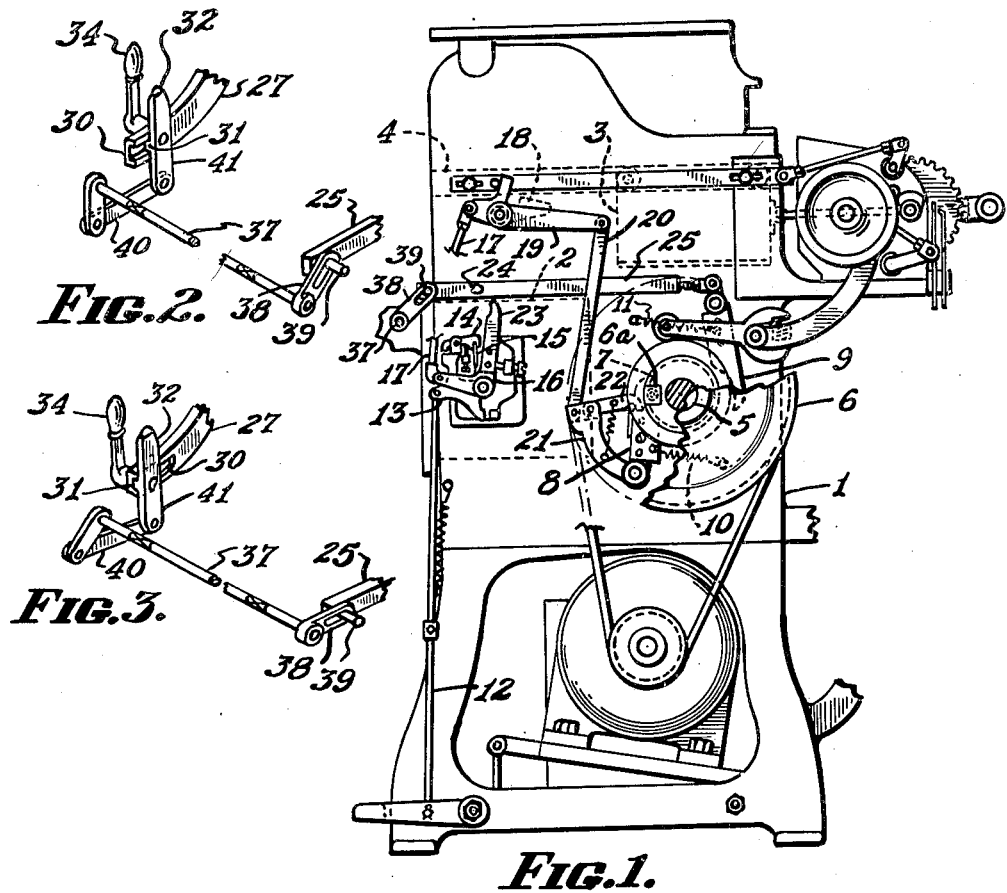
FIG.2.
FIG.3.
FIG.1.
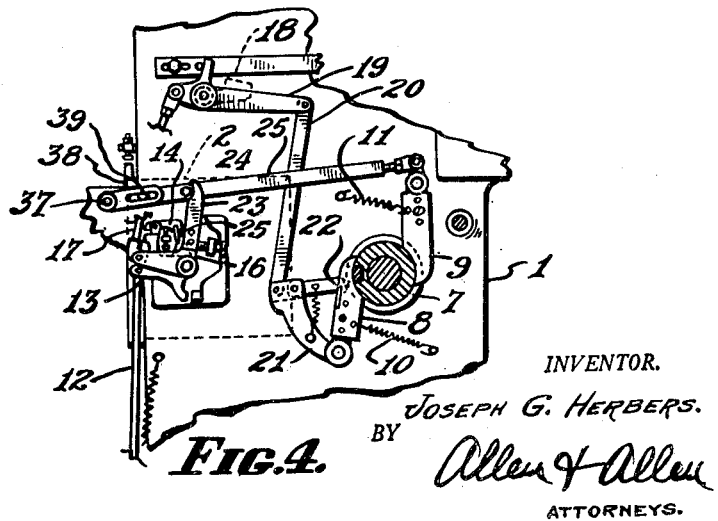
FIG.4.
INVENTOR.
JOSEPH G. HERBERS.
BY
Allen & Allen
ATTORNEYS.

Feb. 7, 1950 J. G. HERBERS 2,496,793
CLUTCH AND BRAKE MECHANISM
FOR ORNAMENTING MACHINES
Filed Oct. 23, 1946 3 Sheets-Sheet 2

INVENTOR.
JOSEPH G. HERBERS.
BY Allen & Allen
ATTORNEYS.

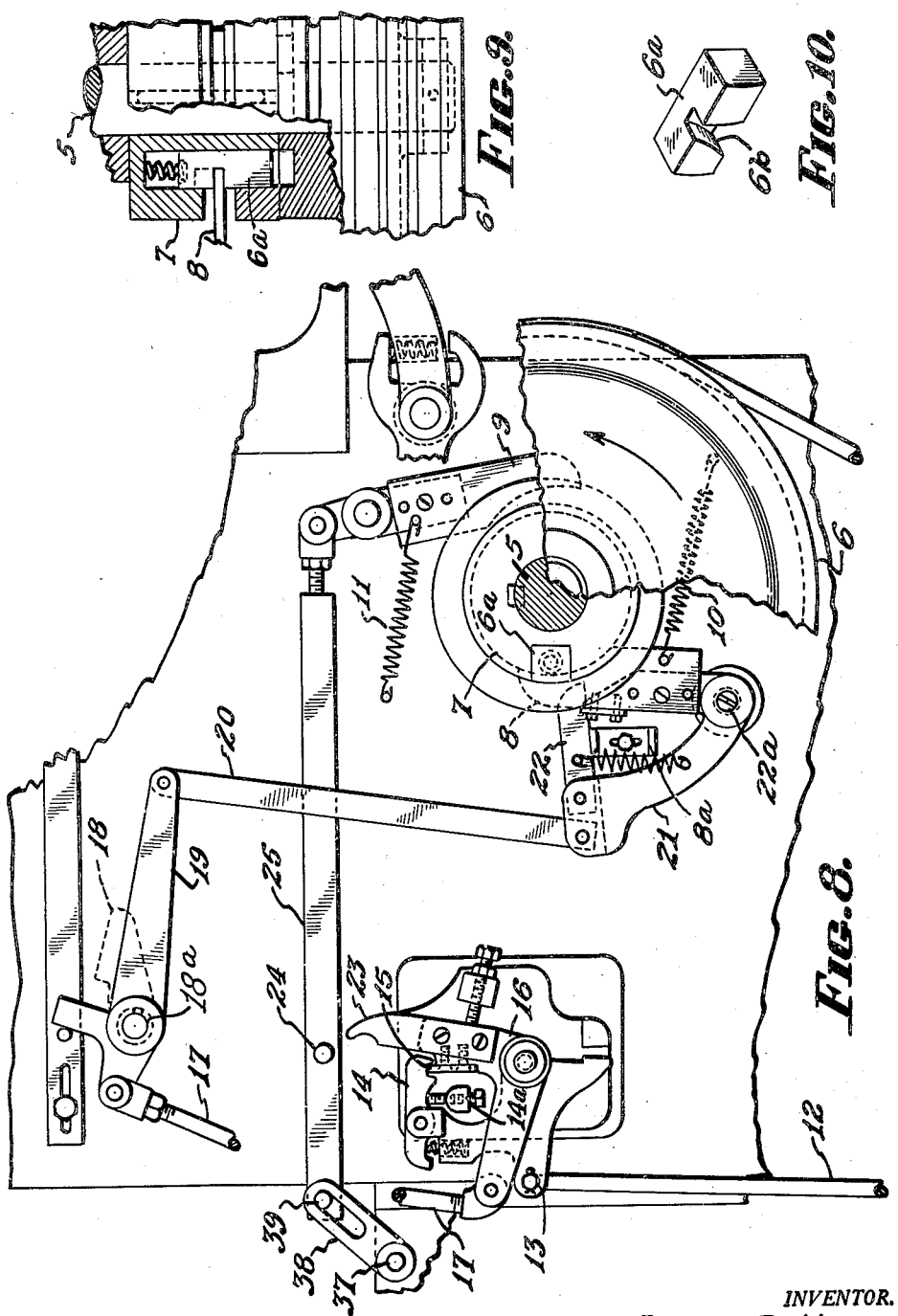

Patented Feb. 7, 1950

2,496,793

UNITED STATES PATENT OFFICE 2,496,793

CLUTCH AND BRAKE MECHANISM FOR ORNAMENTING MACHINES

Joseph G. Herbers, Cincinnati, Ohio, assignor to The Louis G. Freeman Company, Cincinnati, Ohio, a corporation of Ohio Application October 23, 1946, Serial No. 705,072

9 Claims. (Cl. 192—17)

1

In U. S. Letters Patent No. 2,241,398, issued to Benjamin W. Freeman, there is described a mechanism for decorating shoes of a type wherein an overhead die carriage moves to and fro from a rest position to a position for operation, and at its forward position, in the machine is located in the path of a reciprocating bed or plunger, on which the work is supported and gauged. While not limited to this type of machine necessarily, my invention has been applied to machines of this type.

In my Letters Patent No. 2,277,363, is shown and described an improvement devised by me wherein machines of the type of the said Freeman patent or other plunger type machines are equipped to operate on a half cycle, so that instead of the plunger resulting in a sharp blow being imparted to the work and die when in juxtaposition with each other, the plunger is held against the die. Thus, if the die be heated, it will be practical to emboss in the machine of my patent, and yet the machine will also be capable of operation as a cutting out or marking machine or combination of the two.

It is highly desirable in machines, such as now referred to, to control the plunger position very accurately. Thus, if a plunger of the reciprocating variety now referred to is to be stopped at a point, for example a high point, in its cycle of movement, it is desirable to provide a brake which will restrain movement of the plunger the moment power is disconnected therefrom, as for example by means of a single revolution clutch, or a half revolution clutch as described in the patent in my name already referred to.

In a machine in which half cycle and full cycle plunger operations are provided for, and a brake which will stop the movement of the plunger, and yet where the machine is adjustable to operate either on full or half cycle, it is required that when the shift is made to full cycle operation the brake does not apply at the half cycle; and where the machine is set for the half cycle operation, that the brake will apply both at the ends of the half cycle and the full cycle, i. e. at the end of each half cycle making up a full cycle. My invention makes provision for this mode of operation.

I have illustrated in the drawings only those portions of a decorating machine, of the type

2 of the Freeman patent and the Herbers patent above referred to, which have direct relation to the improvement on which the present application is based. As already stated, the improvement applies to other decorating machines so long as they embody a plunger which moves through a cycle to bring a piece of work, say a piece of shoe upper material, into contact with a die or marker of some kind and then return and come to a stop, for removal of the work and insertion of a new piece to be operated upon.

In the drawings:

Figure 1 is a side elevation of the machine illustrated.

Figure 2 is a perspective of the half cycle clutch and brake control in position of full cycle operation.

Figure 3 is a like view to Figure 2, showing the parts for operation in half cycles.

Figure 4 is a detail of the mechanism for half cycle operation showing the half cycle in operation as compared to Figure 1 which is on full cycle operation.

Figure 8 is a partial elevational view on an enlarged scale of the cycle control mechanism, similar to Figure 4, but showing the parts in position for full cycle operation.

Figure 9 is a partial plan view with parts cut away of the clutch mechanism.

Figure 10 is a perspective view of the key.

Figure 5:
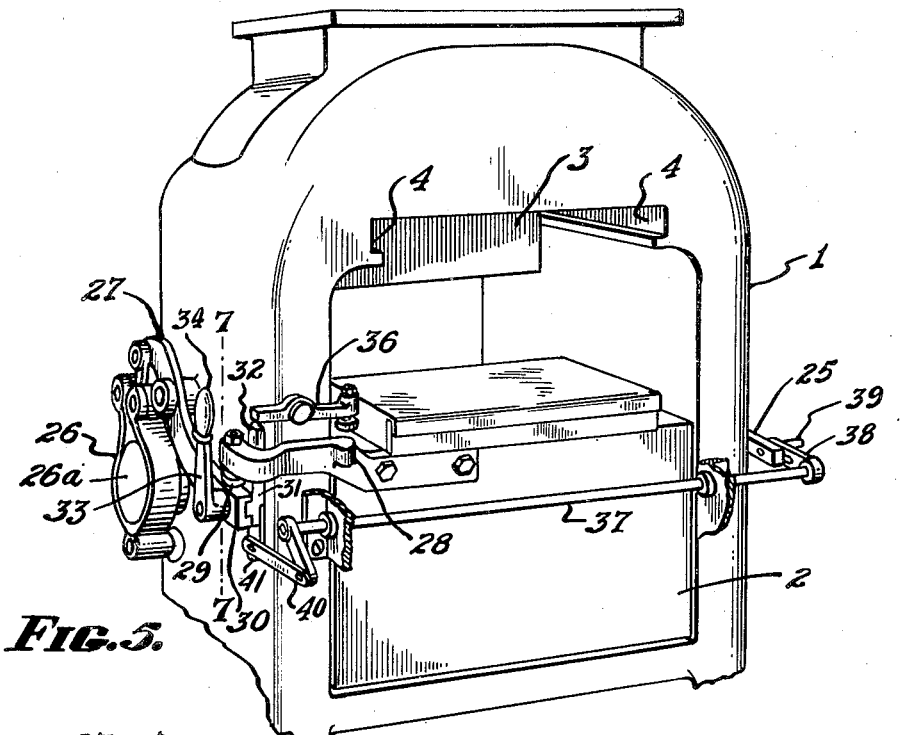
Figure 5 is a perspective showing the brake, and cycle control elements with the plunger of the press operating the brake in half cycle operation.

For a more detailed description of the machine illustrated in the drawings, reference is made to the two U. S. Letters Patent already noted above. Referring to the parts illustrated, the machine frame is shown at 1, the plunger which is caused to rise to make an impression and then move downwardly, is shown at 2, and the die carriage shown at 3. The die carriage moves from a rearward position to a forward position, where it stops while the plunger on which the work is placed moves up and back down again.

The machine frame provides ways 4 for the die carriage.

The mechanism which causes the plunger to move is driven from a shaft 5, and may be, for example, a pair of heavy toggles (not shown) operated from cranks on this shaft 5. To drive the shaft 5, a fly wheel 6 also serving as a pulley is mounted to revolve on the shaft 5 and is connected thereto by a clutch device. The clutch device is set into operation by a spring pressed key 6a shown in Figure 10, which tends to slide under its spring bias into a position to engage a shoulder in the face of the fly wheel 6 or a member rotating therewith. The key is held in a member 7 that is fast on the shaft 5. This relationship is shown in Figure 9.

In order to wedge the key to a position out of driving engagement, provision is made for two latches, the latch 8 and the latch 9, said latches arranged at 180 degrees from each other on opposite sides of the member 7. Each latch is spring biased as by springs 10 and 11, respectively, so as to lie against a recessed portion of the member 7 in position to engage in a groove 6b in the sliding key 6a, said groove so canted that the latch will in each instance pull the key out of engagement with the flywheel 6 against its spring bias, upon engagement with the key groove during rotation of the shaft 5. To release the latches and permit the shaft 5 to be driven, the latches are pulled away from contact with member 7 and are quickly dropped back again, i. e. they are tripped sufficiently that the key passes beyond the point of latch engagement before the latch falls back into position.

In the present mechanism, as in my former patent, the same tripping mechanism is in a sense used for both latches. This mechanism (see Figures 4 and 8) comprises a foot treadle actuated rod 12, which moves a rocker 13. The rocker carries and pulls over a pawl 14 which rides on an abutment 14a (Figure 8), so that when it has moved a short distance, it is raised.

The pawl engages a lip or plate 15 located on another rocker 16 on the same pivot as the rocker 13, this rocker being connected to a rod 17 which is used to throw a starting switch for the carriage moving mechanism of the machine. The carriage, when it has moved to a position at the front of the machine, and above the plunger of the machine on which the work is located, strikes a finger 18 on a shaft 18a extending through the machine frame, and carrying a lever 19 which is rocked thereby. The lever 19 has a link 20 which operates a rocker 21. The rocker has a spring biased pawl 22 thereon (Figure 8) which pulls over the latch 8, which is pivoted on the same pin 22a as the rocker. This pawl 22 is also one which is lifted after a short movement by abutment means 8a, and this releases the latch 8.

To operate the latch 9 which will stop the shaft 5 after one half revolution, i. e. with the machine plunger in its upper position, the rocker 16 already noted as acting in the starting of the die carriage movement, is employed. This rocker is provided with a long arm 23 which will engage a pin 24 on a reciprocating bar 25, when this bar is in its lower position (Figure 4). When in its right-hand position, the bar 25 will permit the latch 9 to rest under its spring bias against the member 7 on the shaft 5. The act of treadling the machine and thus actuating the rocker 16 to move the bar 25 to the left in Figure 4 will trip the latch 9, the mechanism with respect to this rocker serving to release the latch 9 shortly after it has been withdrawn to permit the shaft 5 to start into motion. The release mechanism comprises the pawl 14 and plate 15 hereinabove described.

So far as described, the mechanism is one which has been described in my former patent and in the Freeman patent referred to. The present improvement embodies a brake for the shaft 5 and a mechanism in connection with the shifting of the reciprocating bar 25 for the upper latch 9, which couples the brake mechanism into the system differently when the said bar is in its upper position.

Figure 6:
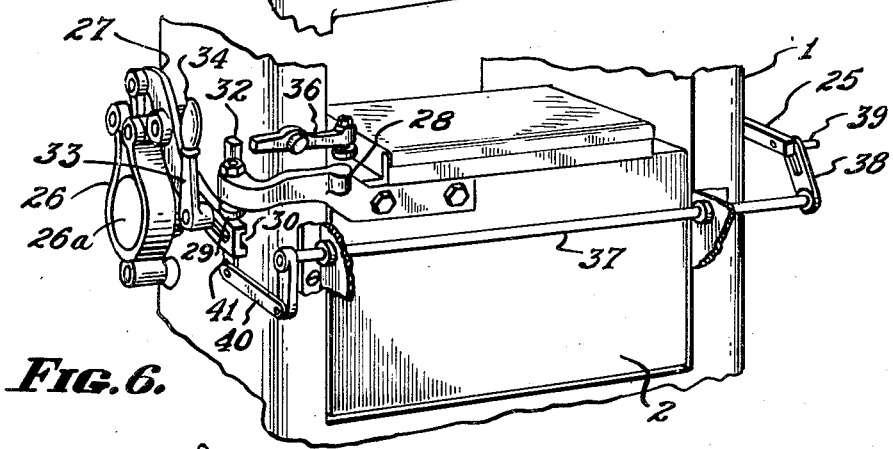
Figure 6 is a like view showing the relation when the half cycle braking does not take place.
Figure 7:
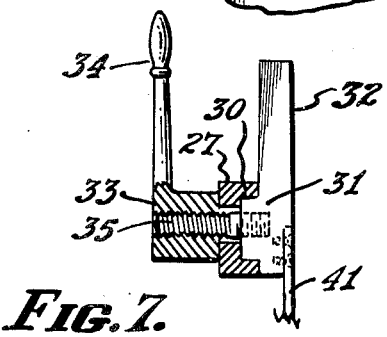
Figure 7 is a detail of the operating lever for the said cycle control and brake control mechanism.

The brake is illustrated at 26 (Figures 5 and 6) and may be a band surrounding a drum 26a on the end of the shaft 5 on the opposite side of the machine from the clutch and fly wheel structure above described. An arm 27 acts to apply the brake and is biased to brake-position. Located on the plunger 2 of the machine is an arm 28 which, when the plunger approaches its lower position engages with the arm 27, and applies the brake. At this same point, the clutch is disengaged from the fly wheel by the latch 8, and thus the plunger will come to a stop at its lowermost position.

An adjustable abutment 29 on the arm 28 is the contact member which permits of adjusting the point of full application of the brake, with reference to the plunger movement.

The inner face of the brake arm 27 is grooved as at 30, and in this groove slides a block 31 which has an upstanding bar 32. On the face of the brake arm which is slotted at that point is located a threaded hub 33 having an operating handle 34. The hub engages over a threaded post 35 projecting through the slot in the brake arm from the block 31. Thus, by throwing over the handle 34, and loosening the screw threaded post 35, the handle can be used to slide the block 31 along the brake arm, through the limits of the slot therein. A centrally pivoted lever 36 is located on the frame of the machine in a position to have one end thereof engaged by the plunger at the upper end of its movement. This lever will then engage the upstanding bar 32, providing the bar has been moved to its forward position by the handle and the slide block mechanism last above described, pushing down on the bar 32 and thence down on the brake arm and applying the brake. The arm 28 which actuates the brake at the lower position of the plunger will still operate as before, because it clears this other brake applying mechanism.

Extending across the front of the machine is a rock shaft 37. This shaft is connected by a slotted arm 38 with a pin 39 on the outer end of the reciprocating bar 25 which actuates the clutch latch 9. In Figures 2 and 8, the rock shaft is shown in a position to elevate the outer or left-hand end of the bar 25, in which position the bar will not be actuated by the arm 23. In Figure 3 is shown the position when the shaft has been rocked and the bar has its left-hand end depressed. The slotted arm 38 will pull the bar 25 endwise to the left when the outer end thereof is elevated as shown in Figure 8, which will act to hold the latch 9 out of position to engage the sliding key 6 of the clutch mechanism. When the slotted arm is in the lower position as shown in Figure 4, the spring bias of the latch 9 to which the bar 25 is connected will slide the bar to the right rearwardly slightly in the figure, permitting the latch to act on the key to stop the shaft 5 in a position when the plunger is at the upper end of the stroke.

The structure which sets the rock shaft 37 is a link 40 which is connected to a depending portion 41 of the upstanding bar 32 which serves as a brake applying abutment, as has already been described.

With the parts so arranged, when the operator wishes to perform an operation, such as heat embossing a piece of work by means of a heated plate on the die carriage, he will manipulate the handle 34 to shift the slide bar 25 to the position shown in Figure 3 and Figure 4, with the result that when he trips the operating pedal, he will first bring the die carriage to its forward position, whereupon the latch 8 will be withdrawn and the shaft 5 will rotate, raising the press plunger. When the plunger has moved to its uppermost position, the brake will be applied to the shaft through the rocking of the lever 36, its engagement with the upstanding bar 32, and the consequent depression of the brake applying arm 27. The machine will then come to a stop. After the proper dwell, the operator will then step on the foot treadle again, releasing the latch 9 from the clutch key, and the shaft 5 will revolve, bringing the plunger to its lowermost position, whereupon the brake will again be applied and the clutch latch 8 will free the shaft 5.

With the parts arranged as in Figure 8, the latch element 9 will be inoperative, and when the operator steps on the treadle, the machine will execute uninterruptedly one full cycle of operation. The brake will not be applied at the half cycle, but only at the conclusion of the full cycle.

As noted in the introduction hereto, it is not necessary for the functioning of the mechanism for applying the brake in the half cycle or full cycle operations of the plunger that the said plunger cooperate with a sliding die carriage, or, if the carriage is sliding, that this need to be by power, or that the plunger should move up to effect an operation on the work instead of down.

The application of the brake is important in the particular type of machine described in order to bring the plunger to definite stopped positions, but it has an apparently wider application to machines of the character here involved. In the broader sense, various one revolution and half revolution clutching means can be provided.

Having thus described my invention by an example thereof, what I claim as new and desire to secure by Letters Patent is:

1. In a machine of the character described, the combination with a plunger and an operating shaft therefor, and a clutch device in connection with said shaft having one-revolution and half-revolution control elements selectively operable for applying power to the plunger operating shaft, a brake for constraining the rotation of said shaft, brake operating means actuated by the movement of the plunger to apply the brake at the conclusion of the one revolution movement, and brake operating means also actuated by the movement of the plunger to apply the brake at the conclusion of the half revolution movement and an interconnection between said last mentioned means and said selectively operable control elements.

2. Means for applying a brake at the close of a full reciprocation and a half reciprocation of a plunger in machines of the character described, comprising a friction brake, an element for operating the same, an abutment moving with the plunger arranged to move the element to brake applying position when the plunger is in home position, and means movable by the plunger to move the element to brake applying position when the plunger is at half stroke, and means for controlling the application of half reciprocation to the plunger, said means including an element to inhibit the operation of the brake applying means at half stroke.

3. The combination of claim 2 in which the first means for moving the brake operating element is an abutment on the plunger, and the second means is a medially pivoted lever one arm of which is engaged by the plunger and the other arm moves the brake operating element.

4. The combination of claim 2 in which the means for engaging the brake arm at half stroke comprises a medially pivoted lever, one arm of which is engaged by the plunger and the other arm of which moves the brake operating element, the means to inhibit the half reciprocation having an abutment which intervenes between the said other arm of the lever and the brake applying element.

5. In a machine of the character described the combination with a plunger, an operating shaft therefor, and a clutch therefor having a pair of clutch releasing fingers for full revolution and half revolution, means for operating the releasing finger for the half revolution comprising a movable member, a manual tripping mechanism for operating the movable member in one position thereof, a brake mechanism for applying a brake to said shaft, and means on the brake mechanism for inhibiting its operation at the half revolution, said means engaging the movable member and arranged to hold it out of clutch releasing position.

6. The combination of claim 5 in which the last noted means comprises a shifter for the brake mechanism, a rock shaft moved by said shifter and a link from the shaft to said movable member, said link arranged when the shaft is rocked in one position to shift the movable member out of operative relation with the tripping mechanism and simultaneously move it to position of shifting the clutch operating finger, and when the shaft is rocked to the other position to place the operating member into operative position with said tripping mechanism.

7. The combination of claim 5 in which the brake is provided with an arm for applying it, a lever is arranged to be engaged at one side of its pivot by the plunger, and located on the brake arm is a sliding member movable into and out of position for engagement by the other arm of said lever, said sliding member having linkage to said movable member.

8. In mechanism of the character described, a moving plunger having a cycle of movement from rest to operating position and return, an operating shaft having a connection with said plunger, means including a clutch for applying power to said shaft, selectively operable clutch control elements, one being effective for full cycle operation, the other being effective on the half cycle, a brake for said shaft, operating means on said brake, an abutment in connection with said plunger for actuating said brake operating means in the rest position of said plunger, means movable by said plunger when approaching the operating position, a movable abutment on said brake operating means, movable means for selecting the operation of said clutch control elements, and a connection between said movable abutment and said selecting means effective when said half cycle control element is employed, to bring said movable abutment into position to be engaged by the said plunger actuated movable means whereby to apply the brake to said shaft on the half cycle.

9. The apparatus claimed in claim 8 including a treadle, means connecting said treadle to the first mentioned clutch control element, said selecting means including a connection to said second mentioned control element, and serving to connect said second mentioned clutch control element to said treadle when set for half cycle operation.

JOSEPH G. HERBERS.

REFERENCES CITED

The following references are of record in the file of this patent:

UNITED STATES PATENTS

| Number | Name | Date |
|---|---|---|
| 1,391,923 | Vick | Sept. 27, 1921 |
| 1,547,355 | Bayer et al. | July 28, 1925 |
| 2,277,363 | Herbers | Mar. 24, 1942 |